UNITED STATES PATENT OFFICE.

LEON LILIENFELD, OF VIENNA, AUSTRIA-HUNGARY.

MANUFACTURE OF ARTIFICIAL TEXTILE MATERIAL AND PROCESS OF PRODUCING SAME.

1,217,028. Specification of Letters Patent. Patented Feb. 20, 1917.

No Drawing. Application filed October 20, 1913. Serial No. 796,249.

*To all whom it may concern:*

Be it known that I, LEON LILIENFELD, a subject of the Emperor of Austria-Hungary, residing at No. 1 Zeltgasse, Vienna, VIII, in Austria-Hungary, have invented certain new and useful Improvements in the Manufacture of Artificial Textile Material and Processes of Producing Same, of which the following is a specification.

In the ethers of cellulose or of its conversion products and derivatives, that is to say, compounds of cellulose or its conversion products or derivatives in which one or more hydroxyl-hydrogens of cellulose are replaced by alkyl radicals, the inventor has discovered materials which by themselves, or in admixture with suitable substances, are adapted for the manufacture of artificial filaments or threads and more especially artificial silk, artificial hair or the like.

The great suitability of the ethers of cellulose for the above stated uses, is due to the following advantages:

1. Their extreme permanency and neutrality. They withstand heating whether water is present or not; and they are also resistant to the action of hot liquids containing either alkalis or acids. Their permanency exceeds that of all simple and mixed cellulose-esters, also of all hitherto known conversion products and derivatives of cellulose.

2. The great suppleness and resistance to chemical and physical influences and the notable toughness and hardness of the threads or filaments produced from the solutions or jellies of the ethers of cellulose.

3. Their ready and complete solubility in an almost unlimited number of solvents.

4. Their relative incombustibility.

5. Their low specific gravity.

The extraordinarily large number of solvents and solvent mixtures for the ethers of cellulose permits of treating the ethers of cellulose combined with an extraordinarily large number of softening agents and colloiding mediums.

This large variety of solvents renders it also possible to combine the ethers of cellulose with many colloids or binding substances and plastic substances with which the hitherto known and used cellulose derivatives could not be combined.

Of the colloids, binding, thickening, plastic or softening substances and colloiding mediums in conjunction with which the ethers of cellulose may be treated, the following instances are given by way of example:—

Cellulose (oxy-cellulose, hydro-cellulose, acid cellulose and the like), raw viscose (cellulose xanthogenate), viscose (purified by means of salts, alcohols, weak acids, bisulfites, acids and salts, carbonic acid or the like), and the raw or purified salts and derivatives of viscose, cellulose-nitrates (nitro-celluloses), cellulose formates, cellulose acetates (acetyl-celluloses) or the like, albumens and proteids, glue, (gelatin), amyloid, starch and starch-like substances (inulin, levulin, lichenin and the like), dextrin, gums (gum arabic, gum tragacanth, rape gum and the like), vegetable mucilages, agar-agar, galactan, and the like, pectins, tragasol, resins and the resinous condensation products of phenols and aldehydes or aromatic amins and aldehydes, shellacs, soft resins, non-drying oils, oxidized and non-oxidized drying oils, rubber, guttapercha, balata, rubber substitutes, regenerated rubber, metallic resinates and oleates, waxes, paraffin, ceresin, soaps, fats, glycerin, sugars and syrups, ammonium and alkali compounds of the fatty sulfonic acids (for instance Turkey red oil, "Turkon" oils or the like), camphor, and the substitutes for camphor employed in the celluloid industry (such as naphthalene, phosphoric acid esters of the phenols, etc.) or the like.

The manufacture of threads or filaments is carried out in the same manner as in the case of cellulose or of its known conversion products and derivatives.

The choice of suitable solvents for ethers of cellulose is much wider than of solvents for the hitherto known cellulose derivatives. Thus, for instance, many cellulose ethers are soluble in alcohol, methyl-alcohol, glacial acetic acid, formic acid, pyridin, quinolin, picolin, di-chlorhydrin, epi-chlorhydrin and the like, nitro-benzene, ethyl-acetate, ethyl phthalate, ethyl-sebacate, ethyl-citrate, ethyl-succinate, ethyl-tartrate, amyl-acetate, butyl-acetate, ethyl benzoate, ethyl-levulinate and the like, acetone, pentachlor ethane, tetrachlor ethane, trichlor ethylene, acetylene dichlorid, carbon tetrachlorid, chloroform and the like, benzene, toluene, xylene, phenol, nitro-phenols, ortho-cresol and the like, naphthalene.

toluidin, anilin and the like, formanilid, acetanilid and the like, turpentine oil, camphor, castor oil, linseed oil, Chinese wood oil, olive oil and the like, vaseline oil, paraffin oil, naphtha (petroleum), vaseline or the like, stearin, beeswax, Japan wax, lanolin and the like, nitro-methane, di-phenyl-ether, triphenyl-phosphate, tri-cresyl-phosphate, etc.

Consequently the processes usually employed hitherto for the known cellulose derivatives may be departed from only in part as regards the selection of the solvent employed and partly as regards the addition of softening or binding agents or colloids or plastic substances, the number of which is practically unlimited owing to the very numerous solvents for the cellulose ethers, whereas the number of solvents for the known cellulose derivatives is, on the contrary, distinctly limited.

A cellulose ether, e. g. cellulose ethyl ether (see my U. S. Patent 1,188,376) is dissolved in a suitable solvent (for instance, benzene, alcohol, a mixture of alcohol and benzene, a mixture of ethylene-trichlorid or acetylene-dichlorid and alcohol, a mixture of alcohol and ether, or the like), and then spun in the usual manner through fine nozzles or capillary orifices, with or without an admixture of another cellulose derivative such as for instance, nitrocellulose, acetyl-cellulose, formyl-cellulose or the like, or of softening substances (plasticity increasing agents, or agents capable of increasing the suppleness) such as oils, fats, phosphoric acid esters of the phenols or the like. The filaments issuing from the nozzles or capillary orifices may either be dried immediately or be led through suitable precipitating baths in which the cellulose ethers are insoluble.

The artificial filaments or textiles thus produced are adapted for use as substitutes for the natural filaments or textiles, for instance silk or the like. They may also be employed instead of the hitherto known artificial silks. They are also suitable for use as substitutes for animal hair and the like.

The present application is in part a continuation of my copending application 754,333, filed Mar. 14, 1913, in which case is claimed plastic materials generally, comprising the substances specified herein.

Having now described my invention what I claim as new and desire to secure by Letters Patent is:—

1. An artificial filament containing as an essential thereof, an ether of a cellulosic substance in admixture with a material capable of increasing the suppleness thereof.

2. An artificial filament containing as an essential constituent thereof, an ether of cellulose in admixture with an ester of a phenol.

3. An artificial filament, characterized by containing an ether of a cellulosic substance in which at least one of the hydroxyl-hydrogens of the cellulose molecule is replaced by an alkyl radical, substantially as described.

4. An artificial filament, containing as ingredients thereof an ether of cellulose and a phosphoric acid ester of a phenol.

5. Artificial silk composed of a material containing an alkyl ether of cellulose which is practically insoluble in water, but soluble in some organic solvents, together with a substance capable of increasing the suppleness thereof.

6. Artificial textile material containing as an essential constituent thereof, an ether of a cellulosic substance.

In testimony whereof I have signed my name to this specification in the presence of two subscribing witnesses.

Dr. LEON LILIENFELD.

Witnesses:
HERMAN VUNDERLICH,
AUGUST FUGGER.